Figure 1:
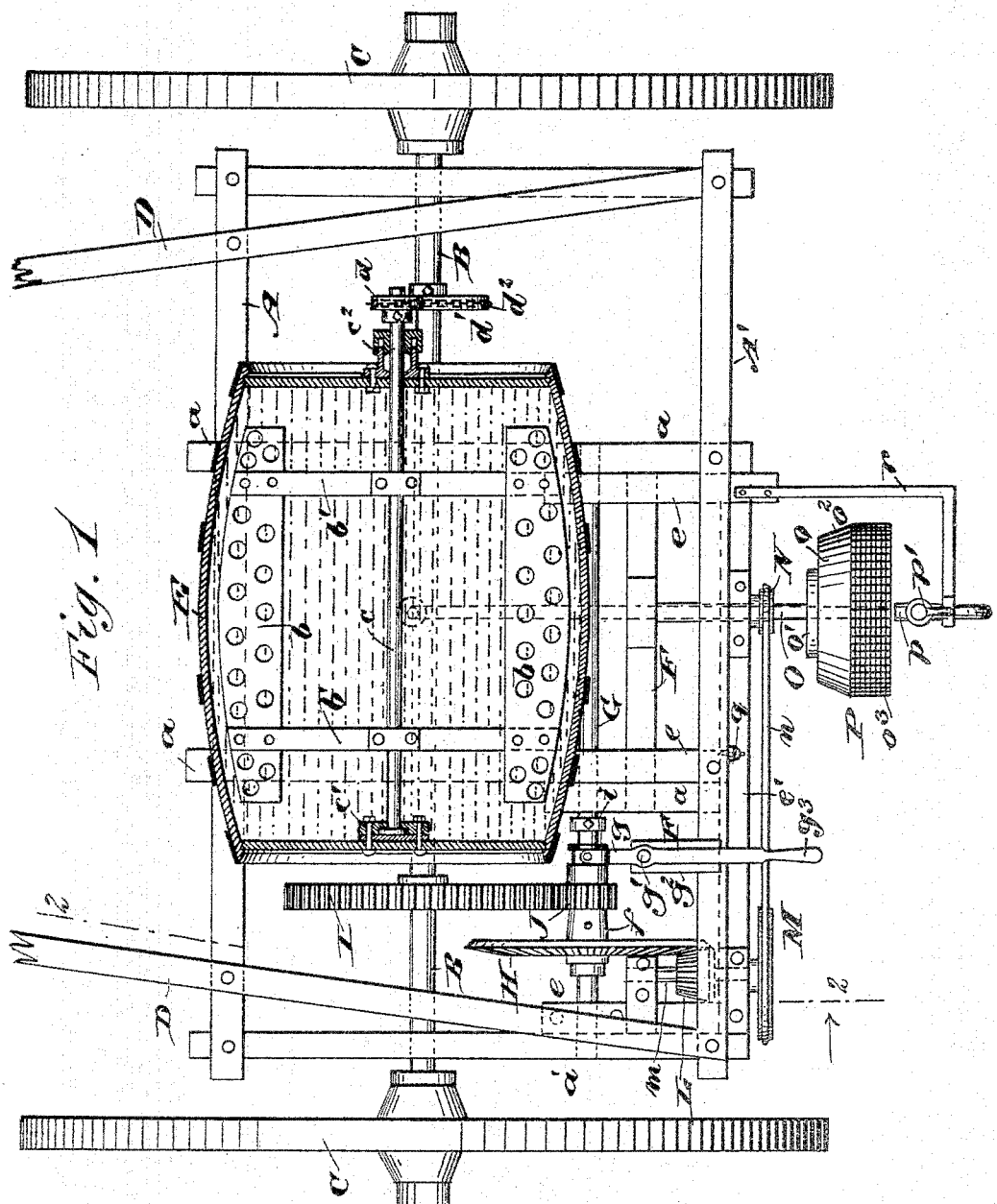

(No Model.) 2 Sheets—Sheet 1.

H. I. SCHANCK & C. B. ELLIS.
SPRINKLING DEVICE.

No. 491,377. Patented Feb. 7, 1893.

WITNESSES:
C. Neveux
C. Sedgwick

INVENTORS:
H. I. Schanck
BY C. B. Ellis
Munn & Co
ATTORNEYS.

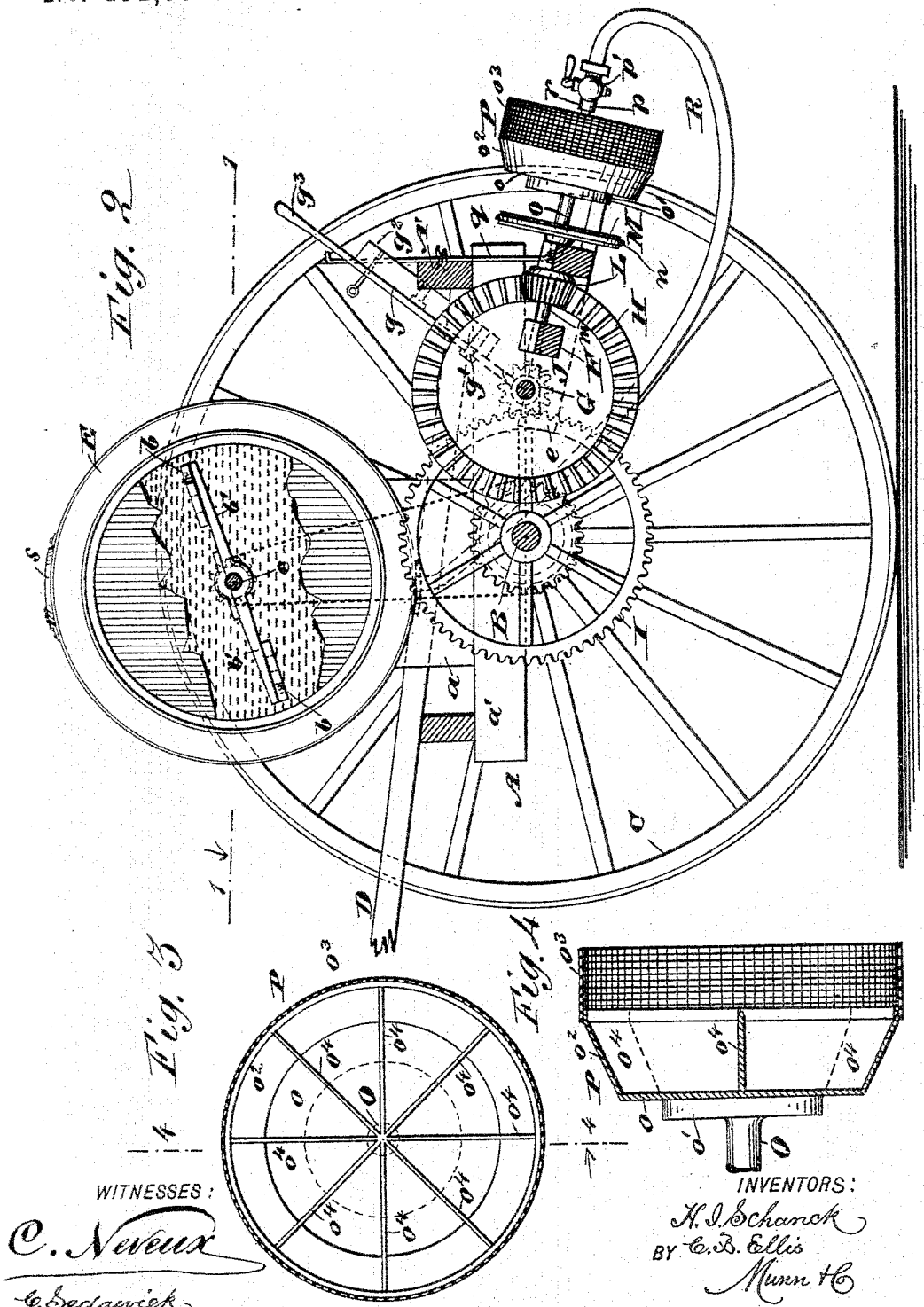

UNITED STATES PATENT OFFICE.

HENRY I. SCHANCK, OF HOLMDEL, AND CHARLES B. ELLIS, OF FREEHOLD, NEW JERSEY.

SPRINKLING DEVICE.

SPECIFICATION forming part of Letters Patent No. 491,377, dated February 7, 1893.

Application filed May 6, 1892. Serial No. 432,007. (No model.)

*To all whom it may concern:*

Be it known that we, HENRY I. SCHANCK, of Holmdel, and CHARLES B. ELLIS, of Freehold, in the county of Monmouth and State of New Jersey, have invented a new and useful Sprinkling Device, of which the following is a full, clear, and exact description.

This invention relates to improvements in wheeled sprinkling apparatus; and has for its object to provide a compact, convenient, and effective device of the type indicated, which will be particularly well adapted for the mixing and distribution of liquid preparations upon growing plants, that may be an insect poison or a fungus destroyer.

To these ends our invention consists in the peculiar construction and combination of parts, as is hereinafter described and claimed.

Reference is to be had to the accompanying drawings forming a part of this specification, in which similar letters of reference indicate corresponding parts in all the figures.

Figure 1 is a plan view partly in section, of the improvement, on the line 1—1 in Fig. 2; Fig. 2 is a side view with a part broken away, and part in section on the line 2—2 in Fig. 1; Fig. 3 is an enlarged detached detail of construction that is part of the improvement; and Fig. 4 is a transverse section of the part shown in Fig. 3, on the line 4—4 in said figure.

There is a suitable frame A, provided, which is supported by an axle B, and wheels C, thereon, this structure being furnished with a pair of shafts D, for an attachment of a draft animal thereto, said shafts being shown broken in the figures where they appear.

The frame A, is furnished with supports $a$, for a large cask E, that is secured thereon centrally between the wheels C, and over the axle B, or any other suitable form may be given to this liquid holding vessel.

Within the cask E, dashers $b$, are secured upon arms $b'$, that are affixed transversely upon a shaft $c$, which latter has one end loosely connected to the center of one head of the cask on its inner side by a box $c'$, the opposite end portion of the shaft being projected through the opposite head of the cask, and also through a stuffing box thereon, as at $c^2$, in Fig. 1. Upon the shaft end that projects beyond the stuffing box $c^2$, a sprocket wheel $d$ of proper diameter is secured, and below aligning with said wheel, a larger sprocket wheel $d'$, is affixed upon the axle B, these sprocket wheels being connected by a chain $d^2$ that will transmit rotary motion from the axle to the shaft $c$, and its dashers $b$; it being understood that the axle is rotatably secured upon the frame A, and the wheels C, rigidly attached upon the ends of said axle.

On the main frame A, at its rear side and near one wheel C, a rocking frame F, is pivotally supported. Said rocking frame is rectangular, and near one of its side edges that is held parallel with the axle A, a countershaft G, is journaled by its end portions in the end rails $e$, of the frame F and in crossbars $a$, $a'$, of the main frame that are adjacent to, and between which the rocking frame is located; the point of pivoted support for the frame F, allowing its free rear side rail $e'$ to lie below the rear bar A' of the main frame.

On the counter-shaft G, an elongated hub $f$, is loosely mounted, its location being near to the end portion of the counter-shaft that rotatably engages with the side bar $a'$, of the main frame A, and upon the hub end which is nearest to said side bar, a bevel gear wheel H, is formed or affixed. At the opposite end of the hub $f$, a circumferential groove is cut, wherein a forked end of the lever $g$, is located; which lever is pivoted at $g'$, on the bracket block $g^2$, that projects from the main frame bar A', toward the counter-shaft, and is thereby adapted to slide the hub and bevel wheel H, endwise of the counter-shaft when vibrated manually at its outer end $g^3$.

Upon the axle B, a spur wheel I, is placed and secured, which is in meshed engagement with a pinion J, that is formed on or is affixed upon the hub $f$, between the forked lever $g$, and bevel wheel H; the width of face given to the spur wheel and meshing pinion being such relatively, as will allow a geared connection of the same to be maintained when the hub is slid until its grooved end impinges upon a fixed collar $i$, on the counter-shaft G.

There is a bevel pinion L, secured upon a short shaft $m$, that is journaled in portions of the rocking frame F, at a proper point to permit the bevel wheel H, to engage with said pinion and transmit rotary motion thereto, when the hub $f$, is slid so as to effect such a geared connection, and the device is progressively moved over a field in service. On the end portion of the shaft $m$, that projects rearwardly from the frame F, and below the main frame bar A', a grooved band wheel M, is secured; and at a point near the center of width of the main frame A, a small grooved pulley N, is supported to align with the band wheel, by a shaft O, that is journaled transversely upon the rocking frame F, these grooved wheels being connected by a band $n$.

The shaft O, projects rearward beyond the rocking frame it is mounted upon, and on its rear end a spraying head P, is attached.

As indicated in Figs. 3 and 4, where it is shown detached, the spraying head P, is constructed mainly of sheet metal, comprising a circular flat back plate $o$, that is fixed concentrically upon a radial flange $o'$ on the shaft end, and on the margin of the back plate, a flaring outwardly projecting wall $o^2$, is affixed by one edge, its outer edge being attached to a cylindrical perforated shell $o^3$, that projects therefrom. Preferably the shell $o^3$, is formed of woven wire fabric of suitable mesh, and proper wire gage to insure stability and efficiency in service. From the center of the back plate $o$, and within the spraying head P, a series of radial wings $o^4$, is secured, which extend to and are connected with the flaring wall $o^2$ their outer edges being about in the same plane with the inner edge of the shell $o^3$. It will be seen that when the apparatus is forwardly moved, the connection of parts will cause a rapid rotary motion to be communicated to the spraying head P.

From the bottom of the cask E, a hose section R, is extended below the rocking frame F, rearwardly and then upwardly, terminating in a jet nozzle $p$, that is held fixed opposite the center of the spraying head P, by an arm $r$, which arm is bent to permit one end to have a secured engagement with the nozzle, while its other end portion is fastened upon the rocking frame, the nozzle having a stop valve $p'$ in its body. If found desirable, however, the stop valve may be screwed into the cask E, and the hose be fastened to the stop valve. At a suitable point the lower end of a suspension link $q$ or like device, is attached to the rear side bar of the rocking frame F, this piece being upwardly projected and adapted for a detachable connection with the main frame rear bar A' at spaced distances apart, so that various degrees of inclination may be given to the frame F, as the needs of service may require.

The cask E, is provided with a filling aperture, that is covered with a lid $s$; or a smaller hole may be formed in the chine of the cask and stopped with a plug or bung.

When the apparatus is to be used, the cask E, is nearly filled with water in which any preferred insect or germ poison is mixed in proper proportions. The machine is now moved by a draft animal to the field where it is to be used, and the rocking frame F, adjusted to suit the height of the growing plants that are to be treated with the liquid poison; and if the crop is planted in rows, the device is progressively moved from end to end of one or more rows with the nozzle $p$ open so that a stream of the liquid will be projected by gravity within the spraying head P, while the latter is rapidly rotated.

The delivery of the liquid from the cask E, is regulated by the valve $p'$, so as to economically use the same; and as it is projected from the jet nozzle, the wings $o^4$, will throw the fluid outwardly with force, causing it to pass through the reticulated shell $o^3$, in a fine spray, whereby the plants beneath and at the sides of the spraying head will be coated with the mixture that is kept stirred up by the rotation of the dasher blades $b$.

Having thus described our invention, what we claim as new, and desire to secure by Letters Patent, is—

1. In a sprinkling apparatus, the combination with a main frame, an axle journaled in the frame and traction wheels rigidly secured on said axle, of a liquid holder supported on the frame, a rocking frame supported below the liquid holder, gearing on the axle and rocking frame that is meshed or detached by a vibratile lever, a shaft rotatable from said gearing and projecting rearward, a spraying head on said shaft, a tubular conduit extending from the holder oppositely of the spraying head, and a stop valve on the conduit, substantially as described.

2. In a sprinkling apparatus, the combination with a main frame, an axle rotatable thereon, fixed traction wheels on the axle, a liquid holder on the main frame and a dasher device within the holder rotated from the axle, of a rocking frame on the main frame below the liquid holder, a shaft on the rocking frame projected rearward, a spraying head on said shaft, gearing on the axle and rocking frame adapted to rotate the spray head shaft, hose extended from the liquid holder oppositely of the spraying head, a jet nozzle on said hose, and a stop valve for the nozzle, substantially as described.

3. In a sprinkling apparatus, a main frame, a liquid holder on the main frame, and an axle and supporting wheels for the main frame, a rocking frame below the main frame and supported on a counter-shaft parallel with the axle, a spur wheel on the axle, and gearing on the rocking frame that is adapted to be rendered dormant or active and connected with the spur wheel, a supported rotatable spraying head receiving motion from said gearing, a conduit leading from the liquid holder to the spraying head, and a stop valve for the conduit, substantially as described.

4. In a sprinkling apparatus, a spraying head, comprising a back plate, a flaring wall on the back plate, a perforated cylindrical shell projected from the edge of the flaring wall, and a series of radial wings within the shell, substantially as described.

HENRY I. SCHANCK.
CHARLES B. ELLIS.

Witnesses:
JNO. T. ROSELL,
EVA S. CONOVER.